US007970867B2

(12) United States Patent
Anonsen et al.

(10) Patent No.: US 7,970,867 B2
(45) Date of Patent: *Jun. 28, 2011

(54) HYPERMEDIA MANAGEMENT SYSTEM

(75) Inventors: Steven P. Anonsen, Fargo, ND (US);
Jason Alan Huck, Fargo, ND (US);
Daniel Edward Seefeldt, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 833 days.

This patent is subject to a terminal disclaimer.

(21) Appl. No.: 11/312,784

(22) Filed: Dec. 20, 2005

(65) Prior Publication Data
US 2006/0095513 A1 May 4, 2006

Related U.S. Application Data

(62) Division of application No. 10/201,544, filed on Jul. 22, 2002.

(51) Int. Cl.
G06F 15/16 (2006.01)
G06F 17/30 (2006.01)

(52) U.S. Cl. ......... 709/219; 709/202; 709/203; 707/705

(58) Field of Classification Search .................... 709/217
See application file for complete search history.

(56) References Cited

U.S. PATENT DOCUMENTS

| | | | |
|---|---|---|---|
| 5,873,093 A | 2/1999 | Williamson et al. | |
| 5,995,946 A | 11/1999 | Auzenne et al. | |
| 6,003,040 A * | 12/1999 | Mital et al. | 707/3 |
| 6,211,847 B1 | 4/2001 | Jeong | 709/201 |
| 6,298,476 B1 | 10/2001 | Misheski et al. | 707/101 |
| 6,301,581 B1 | 10/2001 | Smiley | |
| 6,418,448 B1 | 7/2002 | Sarkar | |
| 6,421,675 B1 | 7/2002 | Ryan et al. | 707/100 |
| 6,463,433 B1 | 10/2002 | Baclawski | |
| 6,498,612 B1 | 12/2002 | Brown et al. | |
| 6,523,035 B1 | 2/2003 | Fleming et al. | |
| 6,571,232 B1 | 5/2003 | Goldberg et al. | |
| 6,591,295 B1 | 7/2003 | Diamond et al. | |
| 6,606,654 B1 | 8/2003 | Borman et al. | 709/219 |
| 6,674,453 B1 | 1/2004 | Schilit et al. | 715/810 |
| 6,701,321 B1 * | 3/2004 | Tsai | 709/219 |
| 6,721,726 B1 * | 4/2004 | Swaminathan et al. | 707/3 |
| 6,763,362 B2 | 7/2004 | McKeeth | 707/104.1 |
| 6,772,139 B1 | 8/2004 | Smith, III | |
| 6,775,674 B1 | 8/2004 | Agassi et al. | |
| 7,010,742 B1 | 3/2006 | Hsu et al. | |
| 7,013,303 B2 * | 3/2006 | Faybishenko et al. | 707/10 |
| 2001/0056426 A1 | 12/2001 | Obendorf | |
| 2002/0095454 A1 * | 7/2002 | Reed et al. | 709/201 |
| 2002/0099738 A1 * | 7/2002 | Grant | 707/513 |

(Continued)

OTHER PUBLICATIONS

Building Applications Frameworks Chapter 11 Capturing Hypermedia Functionality pp. 267-287.

(Continued)

Primary Examiner — Andrew Caldwell
Assistant Examiner — Christopher D Biagini
(74) Attorney, Agent, or Firm — Westman Champlin & Kelly, P.A.

(57) ABSTRACT

A system supplies links between objects. A link service receives a link request from a client. The request identifies a source object. The link service aggregates links from link providers for which the source object is a source of the links, and provides the aggregated links to the client.

16 Claims, 9 Drawing Sheets

U.S. PATENT DOCUMENTS

| | | | |
|---|---|---|---|
| 2002/0169759 A1* | 11/2002 | Kraft et al. | 707/3 |
| 2003/0004956 A1 | 1/2003 | Johnson et al. | 707/100 |
| 2003/0046311 A1 | 3/2003 | Baidya et al. | 707/200 |
| 2003/0097301 A1* | 5/2003 | Kageyama et al. | 707/10 |
| 2003/0105744 A1* | 6/2003 | McKeeth | 707/3 |
| 2003/0126136 A1* | 7/2003 | Omoigui | 707/10 |
| 2003/0187964 A1 | 10/2003 | Sage et al. | 709/221 |
| 2003/0208493 A1* | 11/2003 | Hall et al. | 707/100 |
| 2005/0289120 A9 | 12/2005 | Soulanille et al. | 707/3 |

OTHER PUBLICATIONS

Official Action dated May of 2005, in related U.S. Appl. No. 10/201,548, Filed Jul. 22, 2002, now Patent No. 7769750, issued Aug. 3, 2010, 10 pgs.

Final Office Action dated Nov. of 2005, in related U.S. Appl. No. 10/201,548, Filed Jul. 22, 2002, now Patent No. 7769750, issued Aug. 3, 2010, 14 pgs.

Official Action dated Jun. of 2006, in related U.S. Appl. No. 10/201,548, Filed Jul. 22, 2002, now Patent No. 7769750, issued Aug. 3, 2010, 22 pgs.

Final Office Action dated Oct. of 2006, in related U.S. Appl. No. 10/201,548, Filed Jul. 22, 2002, now Patent No. 7769750, issued Aug. 3, 2010, 11 pgs.

Notice of Allowance dated May of 2010, in related application U.S. Appl. No. 10/201,548, Filed Jul. 22, 2002, now Patent No. 7769750, issued Aug. 3, 2010, 12 pgs.

* cited by examiner

HYPERMEDIA MANAGEMENT SYSTEM

This is a divisional of application Ser. No. 10/201,544, filed Jul. 22, 2002, entitled HYPERMEDIA MANAGEMENT SYSTEM, to Anonsen et al.

BACKGROUND OF THE INVENTION

The present invention relates to hypermedia links. More specifically, the present invention relates to managing hypermedia links between objects.

A number of different databases will first be discussed, although it will be appreciated that the objects need not reside in a database at all. In conventional relational databases that can be used to store the objects, all data are stored in named tables. The tables are described by their features. In other words, the rows of each table contain items of identical type, and the definitions of the columns of the table (i.e., the column names and the data types stored in the column) describe the attributes of each of the instances of the object. By identifying its name, its column names and the data types of the column contents, a table is completely described. Queries to a relational data base are formulated in a query language. One such language is SQL (Structure Query Language) which is widely used in commercial relational data base systems. The data types offered by SQL can be classified as character arrays (names), numbers, and data types related to date and time. Tables can be modified or combined by several operations of relational algebra such as the application of Boolean operators, projection (i.e. selection of columns) or the Cartesian product.

Relational databases offer several advantages. Database queries are based on a comparison of the table contents. Thus, no pointers are required in relational databases, and all relations are treated uniformly. Further, the tables are independent (they are not related by pointers), so it is easier to maintain dynamic data sets. The tables are easily expandable by simply adding new columns. Also, it is relatively easy to create user-specific views from relational databases.

There are, however, a number of disadvantages associated with relational databases as well. For example, access to data by reference to properties is not optimal in the classical relational data model. This can make such databases cumbersome in many applications.

Another recent technology for database systems is referred to as object oriented data base systems. These systems offer more complex data types in order to overcome the restrictions of conventional relational databases. In the context of object oriented data base models, an "object" includes both data and the methods which can be applied to the object. Each object is a concrete instance of an object class defining the attributes and methods of all its instances. Each instance has its unique identifier by which it can be referred to in the database.

Object oriented databases operate under a number of principles. One such principle is referred to as inheritance. Inheritance means that new object classes can be derived from another class. The new classes inherit the attributes and methods of the other class (the super-class) and offer additional attributes and operations. An instance of the derived class is also an instance of the super-class. Therefore, the relation between a derived class and its super-class is referred to as the "isA" relation.

A second principle related to object oriented databases is referred to as "aggregation." Aggregation means that composite objects may be constructed as consisting of a set of elementary objects. A "container object" can communicate with the objects contained therein by their methods of the contained objects. The relation between the container object and its components is called a "partOf" relation because a component is a part of the container object.

Yet another principle related to object oriented databases is referred to as encapsulation. According to encapsulation, an application can only communicate with an object through messages. The operations provided by an object define the set of messages which can be understood by the object. No other operations can be applied to the object.

Another principle related to object oriented databases is referred to as polymorphism. Polymorphism means that derived classes may re-define methods of their super-classes.

Objects present a variety of advantages. For example, operations are an important part of objects. Because the implementations of the operations are hidden to an application, objects can be more easily used by application programs. Further, an object class can be provided as an abstract description for a wide variety of actual objects, and new classes can be derived from the base class. Thus, if an application knows the abstract description and using only the methods provided by, the application can still accommodate objects of the derived classes, because the objects in the derived classes inherit these methods. However, object oriented data bases are not yet as widely used in commercial products as relational databases.

Yet another database technology attempts to combine the advantages of the wide acceptance of relational data bases and the benefits of the object oriented paradigm. This technology is referred to as object-relational database systems. These databases employ a data model that attempts to add object oriented characteristics to tables. All persistent (database) information is still in tables, but some of the tabular entries can have richer data structure. These data structures are referred to as abstract data types (ADTs). An ADT is a data type that is constructed by combining basic alphanumeric data types. The support for abstract data types presents certain advantages. For example, the operations and methods associated with the new data type can be used to index, store, and retrieve records based on the content of the new data type.

Some conventional object-relational databases support an extended form of SQL, sometimes referred to as ObjectSQL. The extensions are provided to support the object model (e.g., queries involving object attributes). However, these object-relational databases are still relational because the data is stored in tables of rows and columns, and SQL, with some extensions, is the language for data definition, manipulation, and query. Both the target of a query and the result of a query are still tables. The extended SQL language is often still the primary interface to the database. Therefore, there is no direct support of host object languages and their objects. This forces programmers to continue to translate between objects and tables.

Thus, in prior object-relational databases, an object can be queried for in terms of the object's fields, rather than using the relational database column names.

However, a number of problems exist with respect to conventional user interface (UI) technology for object-relational technology and other databases or environments (other than databases) where links between objects are desired.

Conventional user interfaces are hand written. This includes the links between different pieces of data in the databases. Each time such a link is desired, it must be hand written again. For example, if an order entry page has been coded to include a link that references customer information, that link has typically been placed by hand. If the order appears elsewhere in the user interface, the link must be hand coded again. Therefore, if a third party integrates an application to the order object, the order page will not show that information or provide links to it, because such links have not been hand coded, even though there may be a link in a representation of the order object that is independent of the UI.

SUMMARY OF THE INVENTION

A system supplies links between objects. A link service receives a link request from a client. The request identifies a source object. The link service aggregates links from link providers for which the source object is a source of the links, and provides the aggregated links to the client.

In one embodiment, the link request identifies an instance of the source object and the link service aggregates links based on the instance of the source object. In another embodiment, the link request identifies the type of the source object and the link service aggregates the links based on the type.

Link providers can register with the link service so they can provide links in response to requests from clients. When a link provider requests to register [JAH1] with the link service, or another system makes the request on behalf of the link provider, the link service can query the link provider to obtain information indicative of the links that the link provider will provide.

Traversal of links yields a link result from the link providers. The traversal result can be a destination object, which is the destination of the link, or an action, or a combination of an action and a destination object (or other targets) which is represented by the link.

DETAILED DESCRIPTION OF ILLUSTRATIVE EMBODIMENTS

Figure 1:
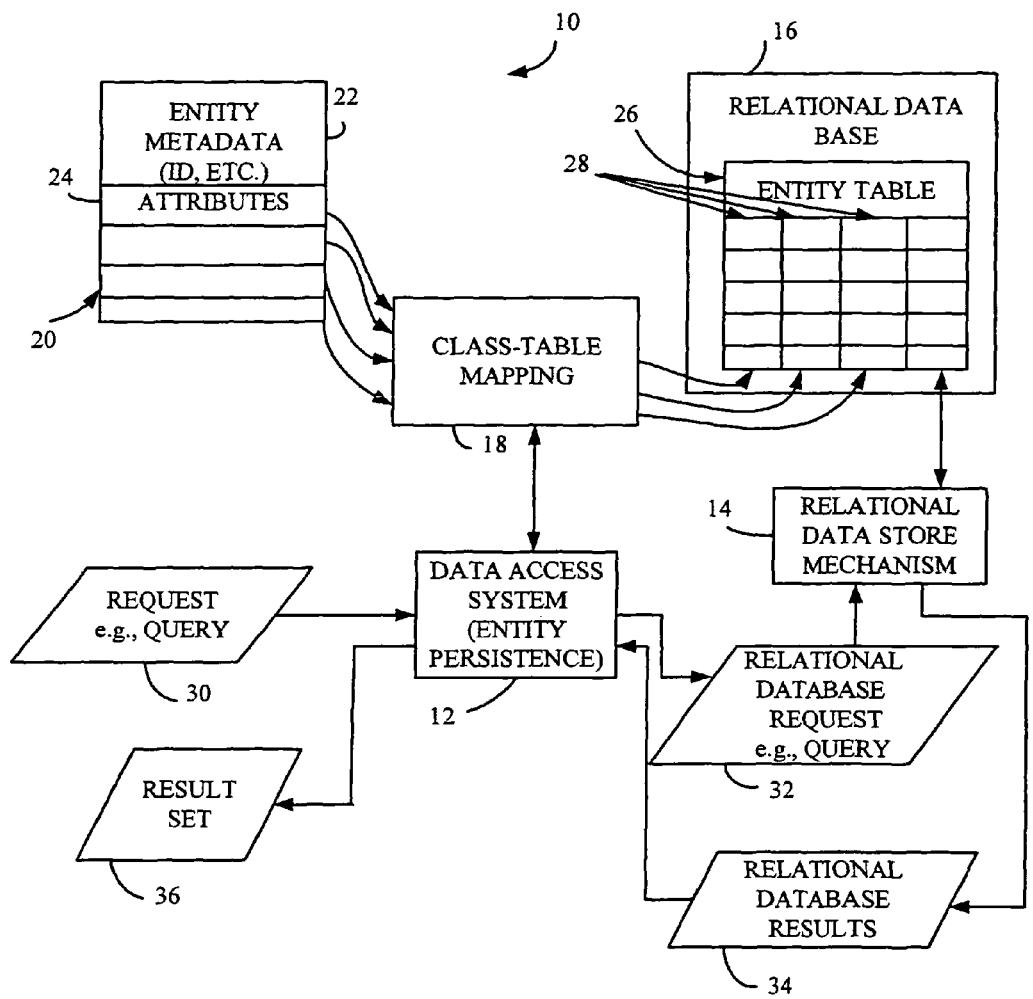
FIG. 1 is a block diagram of one embodiment of an object-relational data storage system.

The present invention relates to maintaining links between objects. In one exemplary embodiment, the links are between objects in an object-relational (O-R) database, although the objects need not be stored in a database system at all, and the present invention can still provide benefits. However, for the sake of the present example, prior to discussing details of the present invention, an environment in which the invention may be used will be discussed FIG. 1 is a block diagram illustrating one embodiment of a data storage and accessing system 10 in accordance with the present invention. System 10 includes data access system (or entity persistence system) 12, relational data store mechanism 14, relational database 16, and class-table mapping 18. System 10 is illustratively an object-relational (O-R) data storage system in which stored data can be referred to in terms of entities (or objects) and their properties, rather than elements of the data base schema, such as tables and columns. FIG. 1 illustrates one mechanism for doing this.

As shown in FIG. 1, the data can be organized in terms of entities 20 (which is used interchangeably herein with the term objects). Each entity illustratively includes a metadata portion 22 and a remaining attributes portion 24. The metadata portion 22 describes the entity 20, while the remaining attributes 24 define further attributes of entity 20, such as the data stored therein. Each of the attributes in entity 20 is mapped to a corresponding entity table 26 and a specific column 28 in a given entity table 26.

Data access system 12 can receive forms of a request such as a query 30 which specifies an entity, or portions of an entity or group of entities, to be retrieved. Query 30 can illustratively be expressed in terms of objects ("entities") and properties rather than in terms of tables and columns. The particular manner in which queries are expressed does not form part of the present invention.

Data access system 12 receives the query 30 and accesses class-table mapping 18. In this way, data access system 12 can determine the location of the data for the entities identified by query 30. Data access system 12 includes a translator 13 that translates query 30 into a relational database query 32 which is suitable for input to relational data store mechanism 14. In one illustrative embodiment, relational data store mechanism 14 is a server that operates according to the SQL programming language in accessing relational database 16. Therefore, data access system 12 receives queries 30 in terms of objects and translates those queries into an appropriate relational database query 32 that is then provided to the data store mechanism (or server) 14 which actually accesses the data in relational database 16.

Relational data store mechanism 14 retrieves the requested data and returns it in the form of relational database results 34. The results are returned to data access system 12 which then formulates the relational database results 34 into a requested result set 36. In one illustrative embodiment, result set 36 is requested in query 30. Query 30 may request that the results be output in the form of one or more objects or simply as a data set. In any case, data access system 12 arranges the relational database results 34 into the proper format and outputs them as result set 36.

Figure 2:
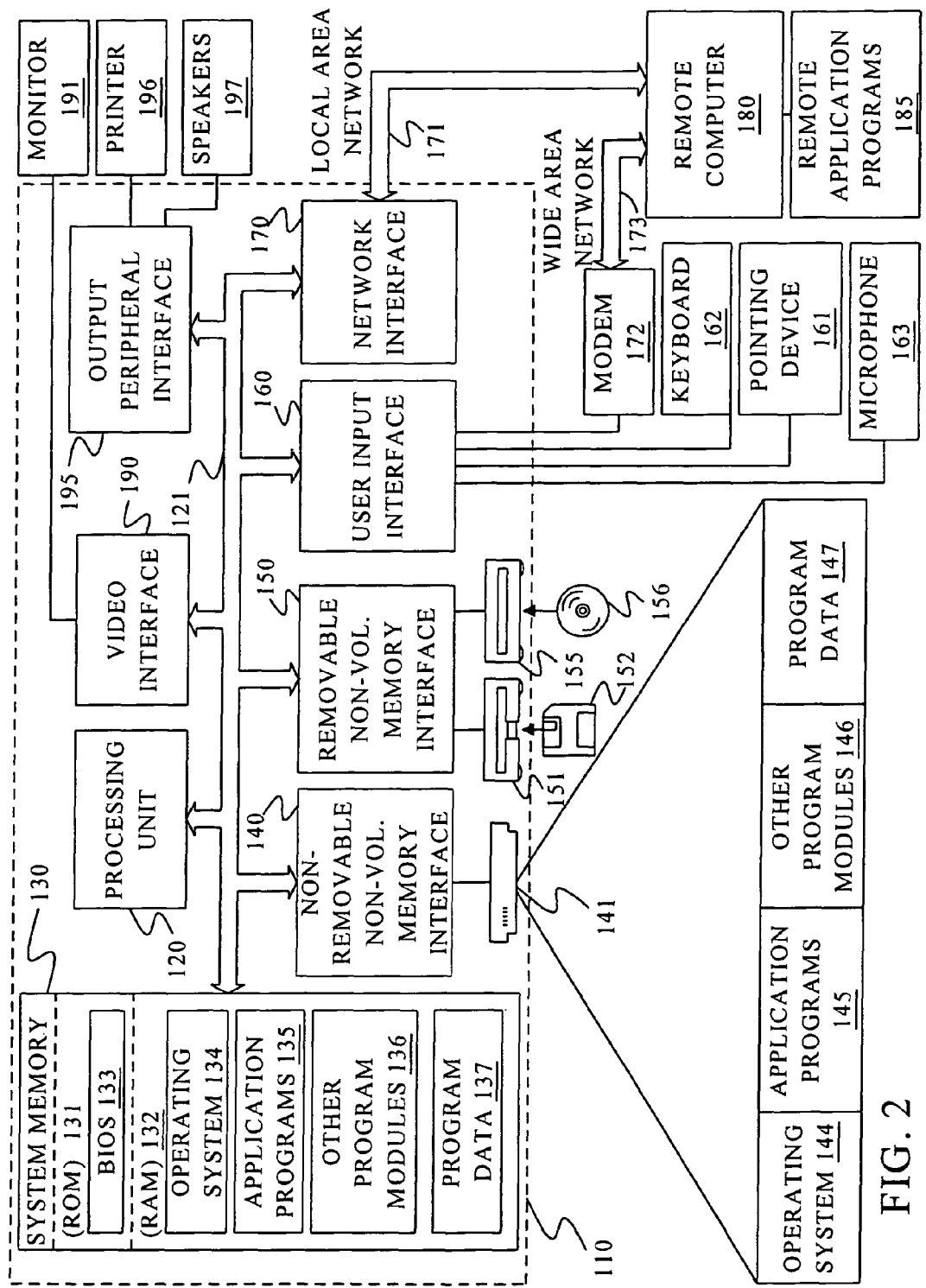
FIG. 2 is a block diagram of an environment in which the present invention can be used.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 2. However, the present invention can be carried out on a server, a computer devoted to message handling, or on a distributed system in which different portions of the present invention are carried out on different parts of the distributed computing system.

As stated in the background, conventional user interfaces have traditionally had any links between objects hand coded. This presents a number of disadvantages. One aspect of the present invention is a system for creating links among objects or entities based on logical relationships between those objects, when no physical relationship necessarily exists. One embodiment of the invention allows the logical relationships among such entities to be surfaced as links in a hyperspace, thus making the entities themselves the nodes of the hyperspace.

Figure 3:
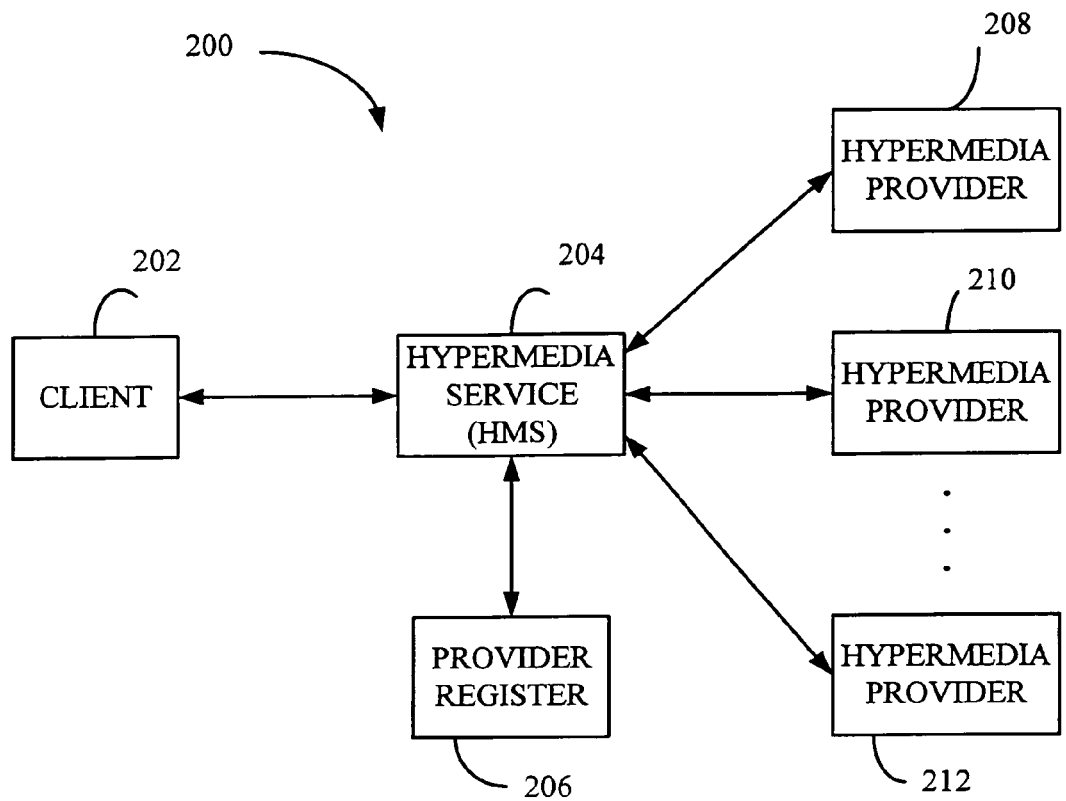
FIG. 3 is a block diagram of a hypermedia service system in accordance with one embodiment of the present invention.

In general, "hypermedia" is referred to as a mechanism for navigating a hyperspace which is comprised of a set of nodes and the hypermedia links that join those nodes. One embodiment of a hypermedia architecture is illustrated in FIG. 3. The hypermedia architecture 200 shows a client 202 that communicates with hypermedia service 204. Hypermedia service 204 accesses a provider register 206 and also communicates with a set of hypermedia providers 208, 210 and 212. Hypermedia service (HMS) 204 is illustratively the central point where clients 202 request hypermedia (i.e., hypermedia links or simply links). Hypermedia providers 208-212 are registered with HMS 204. Providers 208-212 are the points at which the links are actually created. New providers 208-212 can be registered with HMS 204, thus allowing extensibility.

The data that is transferred between client 202 and HMS 204, and between HMS 204 and providers 208-212 conforms, in one illustrative embodiment, to an XML schema attached as an exhibit hereto. The definition of a "link" in the schema includes a link category. Link categories are discussed in greater detail below. Suffice it to say for now that new categories may be defined by a hypermedia provider, thus allowing additional extensibility.

Figure 4:
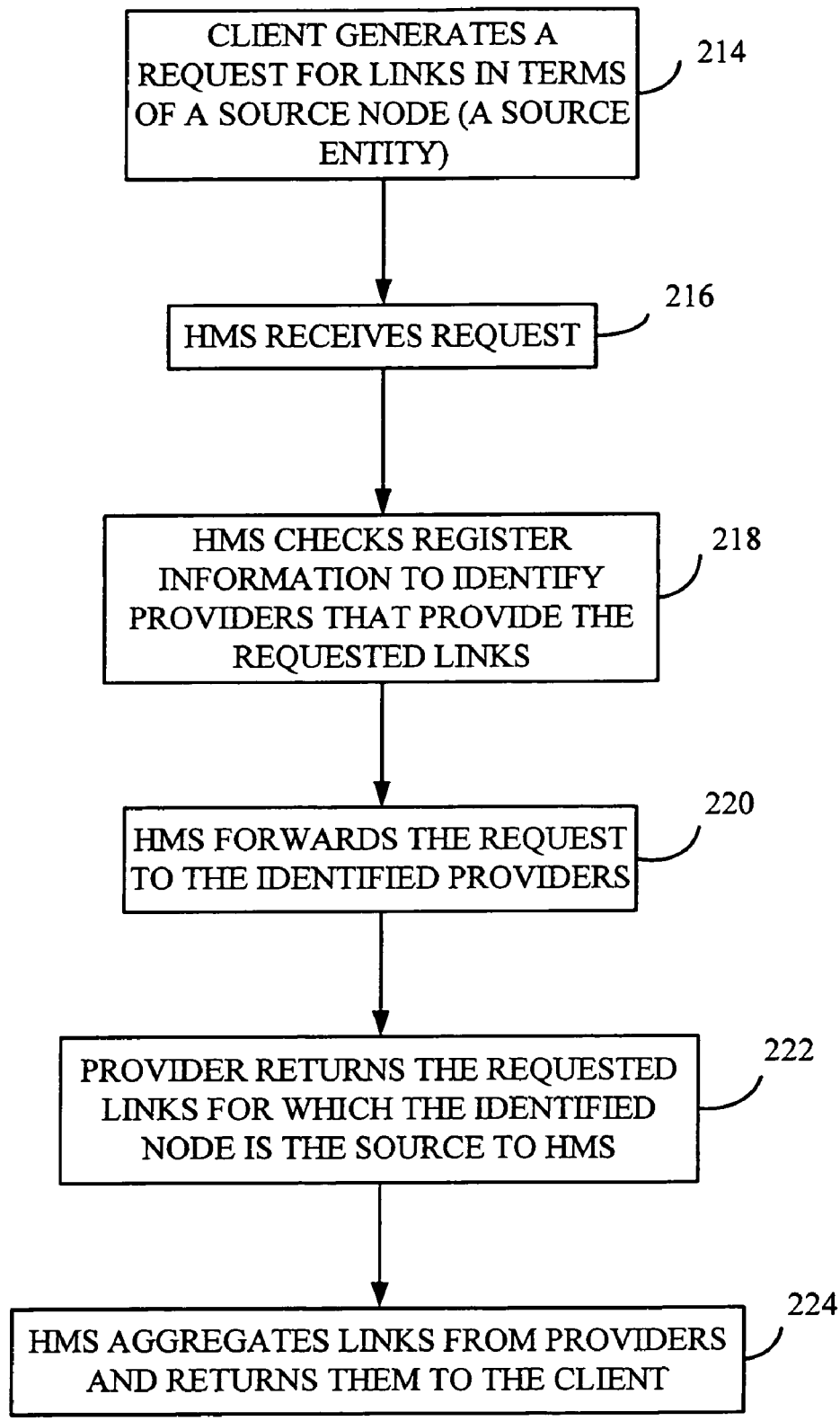
FIG. 4 is a flow diagram illustrating how link requests are processed by the hypermedia service system in accordance with one embodiment of the present invention.

FIG. 4 is a flow diagram better illustrating how a client 202 requests links from hypermedia system 200, and it will be described in conjunction with FIG. 3. In one embodiment, the HMS 204 and link providers 208-212 are objects that expose application programming interfaces (APIs) having methods to accomplish the functionality described. The specific details of the API are described in greater detail in the appendix hereto. Assume that client 200 is displaying a list of customer entities (where the term "entities" is used interchangeably with the term "object"). Assume also that the client wishes to display a set of links to the user for possible traversal. Client 202 first generates a request for links in terms of a source node (i.e., a source entity or a source object). In this example, the client would request the links for the customer object. The request also illustratively specifies which categories of links to be retrieved. The links can represent relationships between nodes, as well as actions that can be performed on nodes, or any other destinations specified.

There are three types of links that can be retrieved: class links, instance links and instance specific links. Class links have the context of a class. They represent either a relationship to a destination node, or an action that can be performed. A class link provides information that is indicative of where a client can traverse to, or what operations can be performed, as they pertain to a particular class.

Instance and instance specific links have the context of an instance. The difference between the two types is that instance specific links are directly tied to a specific instance of an entity (or object), and instance links are tied to a class, but an instance of that class must be specified in order to traverse the link. An instance or instance specific link provides information indicative of where the client can traverse to, and what operations can be performed, with the particular instance being examined.

Figure 6:
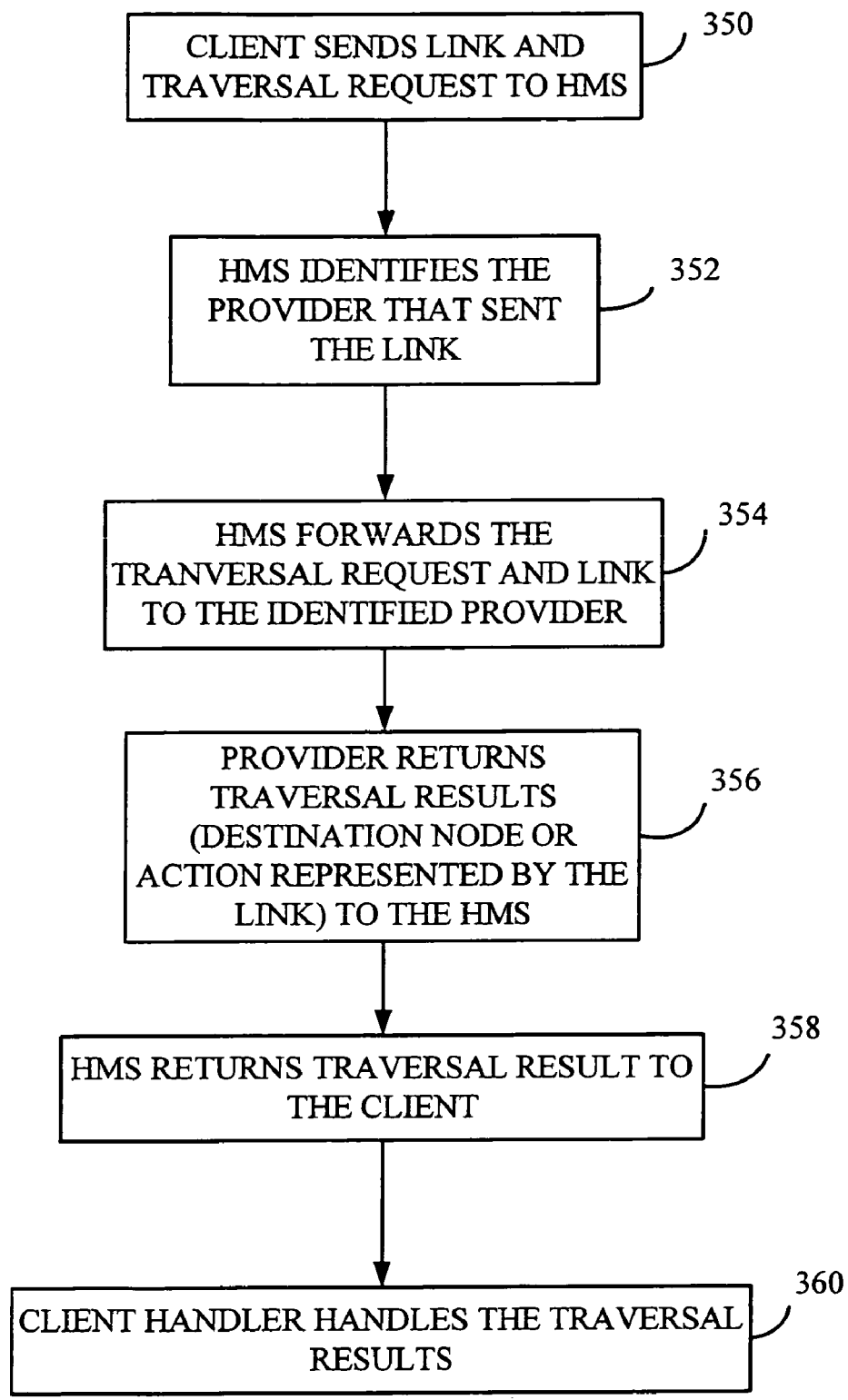
FIG. 6 is a flow diagram illustrating how links are traversed by the system in accordance with one embodiment of the present invention.

All three types of links can be traversed, which is discussed in greater detail below with respect to FIG. 6. Traversal returns the destination node of the link. If the link represents an action, traversal performs the action the link represents, and may or may not return a destination node.

In accordance with one embodiment of the present invention, the type of link is not the only manner in which links may be grouped. Links also illustratively belong to a link category. One example of a link category is a metamodel category. This is described in greater detail below. Briefly, however, links that belong to this link category represent associations between entities. These associations are captured in the metamodel (or object model) of the system.

In addition to being a grouping mechanism, a link category also defines a protocol that is followed by the particular providers 208-212 that supplied the link. The link category gives client 202 an indication of what type of information the link represents, and what type of object will result from traversal of the link. All links of the same category can be handled in the same manner. In this way, client 202 is able to determine how to handle a link based on the link category to which it belongs.

Therefore, client 202 may generate the hypermedia request by requesting class, instance, or instance specific links, or a combination of these. The client 202 can also specify a set of link categories, and only links from those categories will be returned. If no category is specified, links from all categories will be returned. In any case, once client 202 has generated the request for links, and identified a node which will serve as the source of the link, it provides the request to HMS 204. Generating the request and providing it to HMS 204 is indicated by blocks 214 and 216 in FIG. 4.

HMS 204 then checks register 206 for information to identify the particular providers 208-212 that provide links that have, as a source node, the node identified by client 202 as the source of the links. This is indicated by block 218. In other words, during the registration process, providers 208-212 provided HMS 204 with information about the link categories, link types, and node classes for which the provider provides links. This information is stored in register 206. Therefore, when HMS 204 receives a request from client 202, it checks register 206 to determine which providers it should access.

HMS 204 then forwards the request generated by client 202 to the identified providers 208-212 which will provide links having the source node identified by client 202 as the source of the link. This is indicated by block 220.

The providers which receive the request, in turn, return the requested links to HMS 204. This is indicated by block 222. HMS 204 then aggregates all of the links from the providers 208-212 which have responded with links, and returns those links to client 202. This is indicated by block 224 in FIG. 4.

Figure 5:
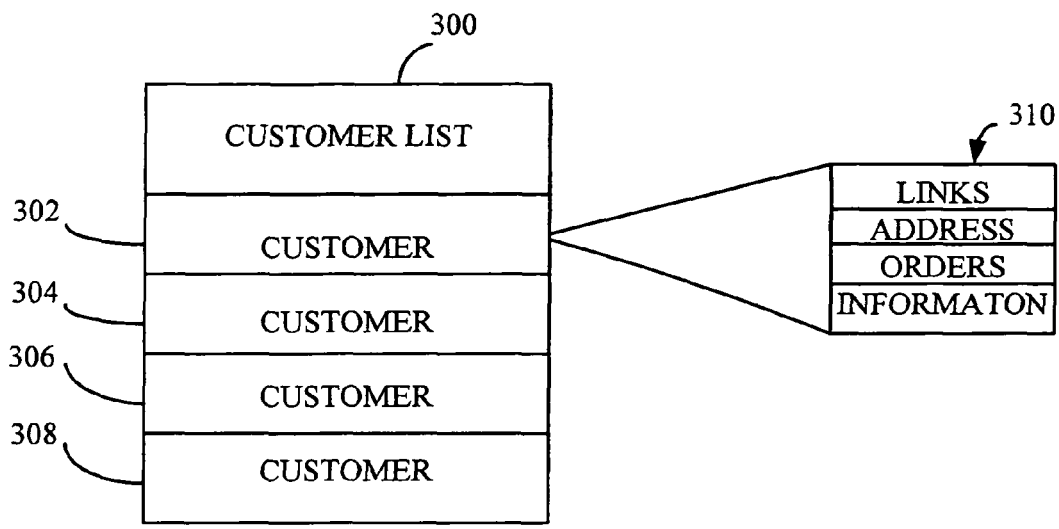
FIG. 5 is an illustration of an exemplary user interface.

FIG. 5 shows an exemplary user interface where links have already been requested. In FIG. 5, the user interface generator that generates display 300 is currently rendering a customer list that displays information about a plurality of customer objects 302, 304, 306 and 308. When the user selects a certain customer object, the user interface generates a request requesting links from HMS 204 where the selected customer object 302 is the source link. HMS 204 goes through the process described with respect to FIG. 4 and returns a set of links for which customer entity 302 (which can also be referred to as customer node 302) is the source node. The user interface generating the display can then display the links 310 as desired. In the example shown in FIG. 5, the links for which customer node 302 is the source node include an address link identifying an Address node associated with customer node 302, an orders link which links to an Orders node corresponding to customer node 302 and a general information link which links to a General Information node corresponding to customer node 302.

In one example, to traverse one of the links 310, the user simply selects it (such as by clicking on it with the mouse cursor). FIG. 6 is a flow diagram illustrating what happens when a link is traversed. After being selected by the user, client 202 sends the link, along with the traversal request, to HMS 204. This is indicated by block 350 in FIG. 6. The link provided by client 202 is illustratively a class link or an instance specific link.

HMS 204 then identifies the particular provider 208-212 that provided the link. This is indicated by block 352. The specific links supplied by the providers in response to requests is maintained by HMS 204 by adding this information to the link during the hypermedia request. This information is then examined during a traversal request. Therefore, HMS 204 can identify the provider which supplied the link.

HMS 204 then forwards the traversal request and link to the identified provider. This is indicated by block 354.

The provider traverses the link, returning traversal results to HMS 204. This is indicated by block 356. The traversal results can include a destination node, which is the destination of the link, or performance of an action represented by the link or both, or other targets represented by the link. For example, if the link represents the relationship between a customer and a query of the customer's orders, traversing the link entails the provider returning the query (which is an entity, like the customer), not the results of executing the query. Likewise, if the link represents the relationship between a customer and a URL of a particular web page containing a map of the customer's address [JAH2], traversing the link returns the URL, it does not open a browser window displaying the page pointed to by the URL. In that example, the link does contain a destination (the URL), but the destination is not an entity or an action. Thus, the traversal result may return an entity, some result which is not an entity, or there may be no substantive result returned. If the link represents an action, traversing the link performs the action and the result may indicate this. Combinations of these types of results can occur as well.

HMS 204, in turn, returns the traversal results to client 202. This is indicated by block 358.

Client 202 illustratively includes a handler that handles the traversal results. For example, if the traversal returns a query, the client handler executes that query against the database and displays the results to the user. If the query returns a URL, the client handler opens a browser window displaying the page pointed to by the URL, etc. Handling the traversal results at the client is indicated by block 360 in FIG. 6.

Figure 7:
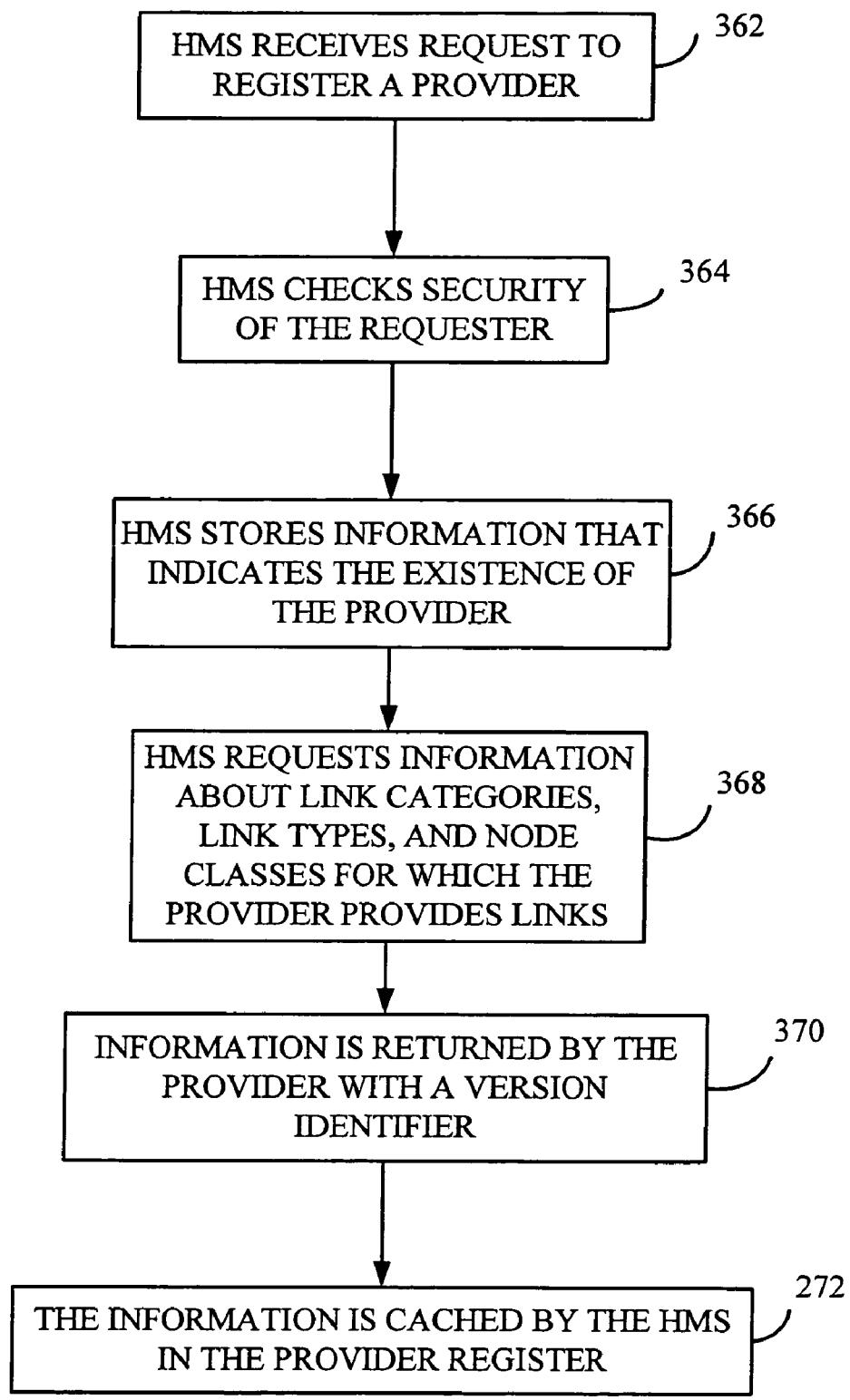
FIG. 7 is a flow diagram illustrating how hypermedia providers are registered in accordance with one embodiment of the present invention.

FIG. 7 is a flow diagram illustrating how a provider is registered with HMS 204. First, HMS 204 receives a request to register a provider. This is indicated by block 362.

HMS 204 then checks the security of the requester. This is indicated by block 364. This involves determining whether the requester has authorization to register a provider and can be done in any known way. This is indicated by block 366.

HMS 204 then requests information from the provider about the link categories, link types and node classes for which the provider provides links. This is indicated by block 368.

The provider returns the information, along with a version identifier. This is indicated by block 370.

HMS 204 then caches the information in provider register 206, and information confirming the success of the registration is returned to the requester. This is indicated by block 372. HMS 204 is then in position to receive requests for links provided by the newly registered provider.

A number of other features of the present invention should be noted. It can be seen from the architecture that any number of providers can be added, at any time. Third party providers who integrate applications to the entities or objects stored in the database can be added and links to those third party applications will automatically be returned by HMS 204, so long as an appropriate provider is registered with HMS 204.

Also, third parties can define new link categories for which their providers will provide links. HMS 204 can operate with no knowledge about what the links are, only knowing that the provider will provide those links. The same is true for new links. An existing provider can add new links and they will be provided when requested. The developer thus need not hand code the links into the system. In one illustrative embodiment, the providers simply need to implement an interface known to HMS 204, such as those described in the Appendix hereto.

In another illustrative embodiment, the interface implemented by HMS 204 derives from the interface implemented by the providers. Therefore, each HMS 204 can also be a provider and can thus be operably connected to another HMS 204.

Also, HMS 204 can be implemented both as an XML web service and as a class which can be called directly if client 202 resides on the same server as HMS 204. The providers can also be either deployed remotely as XML web services or on the same server as HMS 204.

It can thus be seen that, in accordance with one embodiment of the present invention, the links are requested based on object types (or object classes) or specific object instances. The presentation of the nodes is decoupled from the nodes themselves. The nodes are instances of objects rather than presentation elements, such as web pages. This allows client 202 to process or handle the destination node of the link in any manner it wishes.

Figure 8:
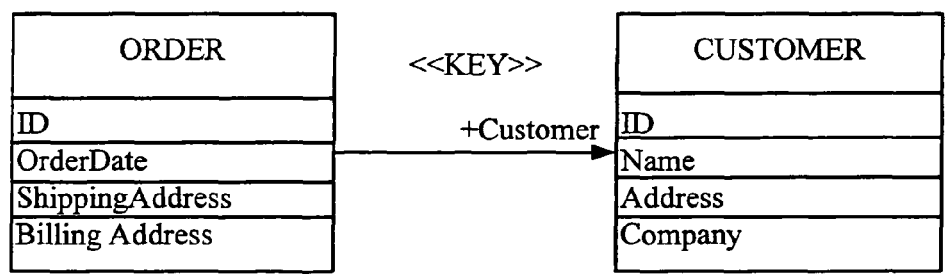
FIG. 8 shows an association between objects.
Figure 9:
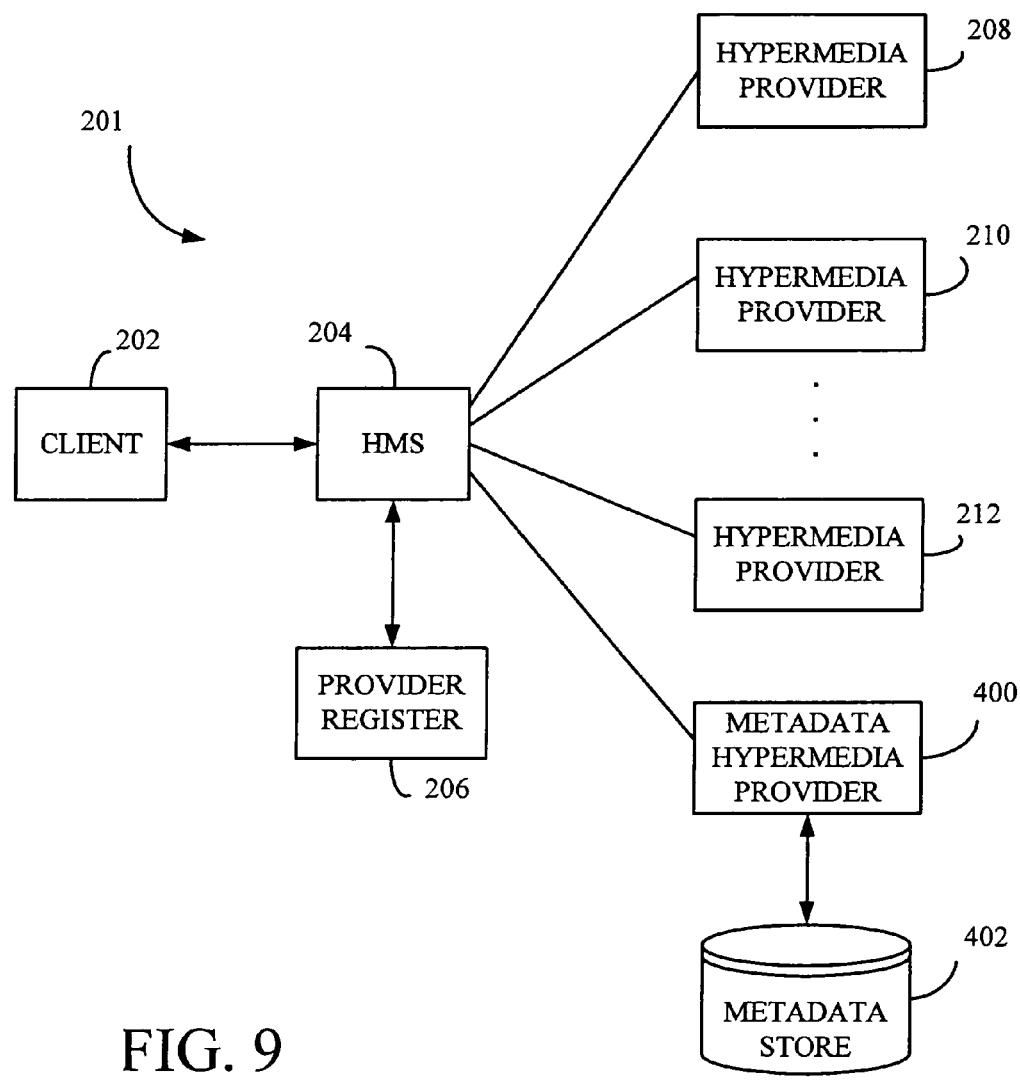
FIG. 9 is a block diagram illustrating another embodiment of a hypermedia system.
Figure 10:
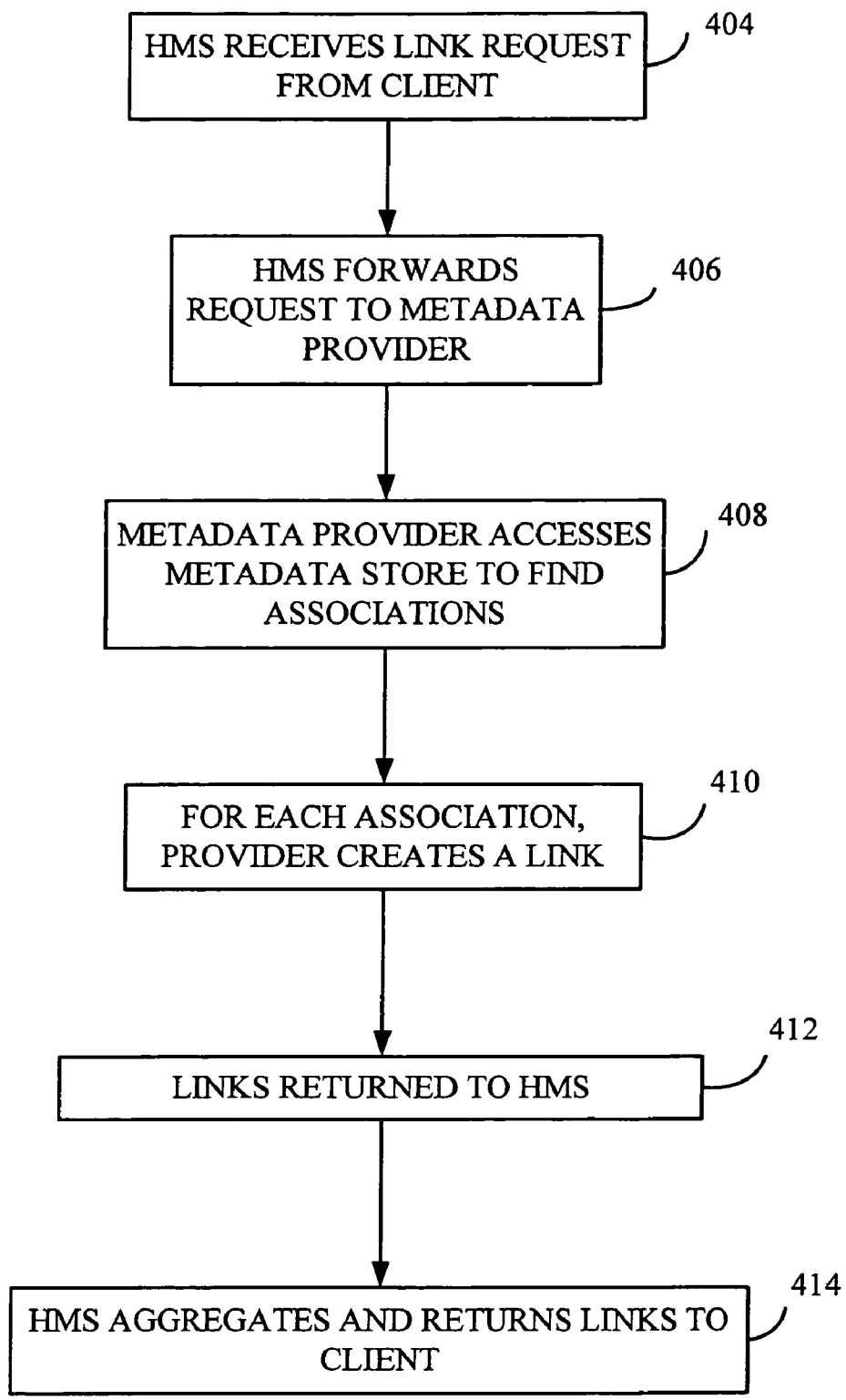
FIG. 10 is a flow diagram illustrating the operation of the system shown in FIG. 9.

FIGS. 8-10 illustrate yet another embodiment of the present invention. In that embodiment, one of providers 208-212 provides links between associated objects based on association metadata. In other words, when developing an application, it is common for a set of objects (such as business objects or entities in a business application) to be defined. Such objects in a business application may include, for example, a "Customer" object, a "SalesPerson" object and an "Order" object. These objects (entities) are interrelated through different associations. For instance, an "Order" has both a "Customer" and a "SalesPerson" associated with it.

Since these associations exist in the problem domain of the application, they are associations that the end user typically understands. Therefore, it may be beneficial to allow the end user to navigate between these associations.

The information that defines these associations is captured in a metamodel (or object model) of the applications as they are being developed. This information is typically stored as metadata. For example, FIG. 8 depicts a relationship between an "Order" entity and a "Customer" entity that is modeled during the application development process.

There are known tools which can be run against object models generated during development of an application. Such tools compile the models into association metadata. In accordance with an illustrative embodiment of the invention, this is done and the association metadata is stored.

FIG. 9 is a block diagram of an embodiment of hypermedia system 201 that takes advantage of the stored association metadata. A number of the items shown in FIG. 9 are similar to those shown in FIG. 3 and are similarly numbered. However, FIG. 9 shows that system 201 also includes a metadata hypermedia provider 400 which is connected to a metadata store 402.

The metadata associations developed during the application development process (such as the information shown in FIG. 8 which illustrates an association between an "Order" entity and a "Customer" entity) is stored in metadata store 402. FIG. 10 is a flow diagram illustrating the operation of system 201 in accordance with one embodiment of the present invention, and will be described in conjunction with FIG. 9.

It is assumed that metadata hypermedia provider 400 has properly registered with HMS 204 and its link and identification data resides in provider register 206. Client 202 first generates a hypermedia request (or link request) specifying which objects are the source of the links sought, and which categories of links are to be retrieved. This request is received by HMS 204. This is indicated by block 404 in FIG. 10. HMS 204 then forwards the request on to the appropriate providers, which in this case will include metadata hypermedia provider 400. This is indicated by block 406.

Provider 400 analyzes association information contained in metadata store 402. One illustrative design of metadata hypermedia provider 400 is discussed in greater detail in the Appendix hereto. Briefly, however, provider 400 examines each association in metadata store 402 which has been requested and determines whether the user has rights to access the associated entities. Provider 400 can determine whether the user has rights to access the associated entities by accessing a security subsystem, or in any other suitable way. Accessing security does not form part of the present invention. Provider 400 then creates a link for each association for which the user has access, and places association information in the link. This is indicated by block 408.

Provider 400 identifies (using terminology defined by the Unified Modeling Language (UML)) simple associations and composition associations; these can have a variety of cardinalities, such as 1-1, 1-many or many-many relationships. Provider 400 also identifies inheritance associations. For each association located by provider 400, provider 400 creates a link between the source node and the associated node. This is indicated by block 410.

The links are returned from provider 400 to HMS 204 as indicated by block 412, and HMS 204 aggregates all returned links and forwards them on to client 202. This is indicated by block 414. In one embodiment, provider 400 does not return the associated node, but instead returns a query whose results, if executed, include only the associated node.

Although the present invention has been described with reference to particular embodiments, workers skilled in the art will recognize that changes may be made in form and detail without departing from the spirit and scope of the invention.

What is claimed is:

1. A system for supplying links between objects, comprising:
   a link service receiving a link request from a client and aggregating a plurality of links to be provided to the client, wherein:
      the link request identifies a specific source object selected by a user input that is a source of the plurality of links which are to be provided to the client, the source object having source object data and source object methods that can be applied to the source object data;
      the plurality of links each provide a hypermedia link from the source object to a different destination object, each destination object having destination data and destination methods that can be applied to the destination data; and
      the aggregated links are identified as links to be aggregated based on the specified source object such that, when instantiated, the source object populates a display with the aggregated links to display links to destination objects;
   a link provider operably coupled to the link service, the link service receiving a request from a requestor to register the link provider to the link service, the link service verifying a security credential of the requestor to determine that the requestor is authorized to register the link provider to the link service, the link service requesting information from the link provider about link categories, link types, and node classes for which the link provider provides links, the link service requesting links from the link provider that have the specific source object as the source of the links; and
   a provider register, operably coupled to the link service, storing register information corresponding to the link provider, the register information identifying source objects for which the link provider provides links, the register information being stored to the provider register during a registration process that occurs prior to the link service receiving the link request from the client, the provider register receiving the registration information from the link service, the provider register being checked by the link service to determine that the link provider has the specific source object as the source of the links prior to the link service requesting the links from the link provider.

2. The system of claim 1 wherein the link request identifies an instance of the source object, wherein the link service aggregates the links based on the instance of the source object, and wherein data transferred between the link service and the client is in an XML schema form.

3. The system of claim 1 wherein the link request identifies the class of the source object, wherein the link service aggregates the links based on the class of the source object, and wherein the link service and the link provider are objects that expose application programming interfaces.

4. The system of claim 1 wherein the register information is indicative of classes of objects for which the link provider provides links, wherein the link request identifies categories of links, and wherein each of the plurality of links to be provided to the client is within one of the categories.

5. The system of claim 1 wherein the register information is indicative of instances of objects for which the link provider provides links, and wherein the link request does not identify any categories of links, and wherein the plurality of links to be provided to the client includes links from multiple categories.

6. The system of claim 1 and further comprising:
a plurality of link providers that are directly coupled to the link service and that are indirectly coupled to the provider register, the provider register storing register information for each of the plurality of link providers.

7. The system of claim 6 wherein the link service accesses the provider register to identify link providers from which to request links, based on the identified source object, and wherein the register information includes link categories, link types, and node classes.

8. A method of maintaining links between objects that have data and methods that can be applied to the data, comprising:
receiving requests from a requestor to register a plurality of link providers to a link service;
verifying a security credential of the requestor to determine that the requestor is authorized to register link providers to the link service;
requesting information from the plurality of link providers about link categories, link types, and node classes for which the link providers provide links;
receiving the requested information from the plurality of link providers at the link service;
storing the requested information to a provider register;
receiving a link request at the link service from a client, the link request identifying an object that is a specific source object in links being requested, the source object being a source of a plurality of links which are to be provided to the client;
utilizing the provider register to identify which of the plurality of link providers have links that have the identified object as a source object;
requesting the links from the identified link providers;
aggregating the links from the identified link providers, at the link service wherein the links aggregated have the identified object as the source object and link the source object, by a hypermedia link, to a destination object that has data and methods that can be applied to the data; and
returning the aggregated links from the link service to the client.

9. The method of claim 8 wherein the link request identifies an instance of the source object, wherein requesting comprises requesting links based on the instance of the source object, and wherein the method further comprises sending a confirmation to the requestor that the plurality of link providers were successfully registered.

10. The method of claim 8 wherein the link request identifies a class of the source object, wherein requesting comprises requesting links based on the class of the source object, and wherein the method further comprises receiving version identifiers from the plurality of link providers at the link service.

11. A method of supplying links between objects, comprising:
requesting that a plurality of link providers be registered to a link service;
receiving requests from a requestor to register the plurality of link providers to the link service;
verifying a security credential of the requestor to determine that the requestor is authorized to register the link providers to the link service;
requesting information from the plurality of link providers about link categories, link types, and node classes for which the link providers provide links;
storing the information to a provider register;
receiving a request for links for a particular source object from a client;
utilizing information in the provider register to identify which one or more of the plurality of link providers has links that correspond to the particular source object;
sending a request for the links that correspond to the particular source object from the link service to the one or more of the plurality of link providers; and
transmitting the links that correspond to the particular source object from the link service to the client.

12. The method of claim 11 wherein storing the link information to the provider register comprises caching the link information.

13. The method of claim 11 and further comprising:
registering additional link providers to the link service.

14. The method of claim 11 wherein the link service is implemented as an XML web service.

15. The method of claim 11 wherein the link service is implemented as a class.

16. The method of claim 15 wherein the client and the link service reside on a same server.

* * * * *